Oct. 9, 1962  J. A. GROSS  3,057,700
PHOSPHORIC ACID PROCESS
Filed Oct. 12, 1959
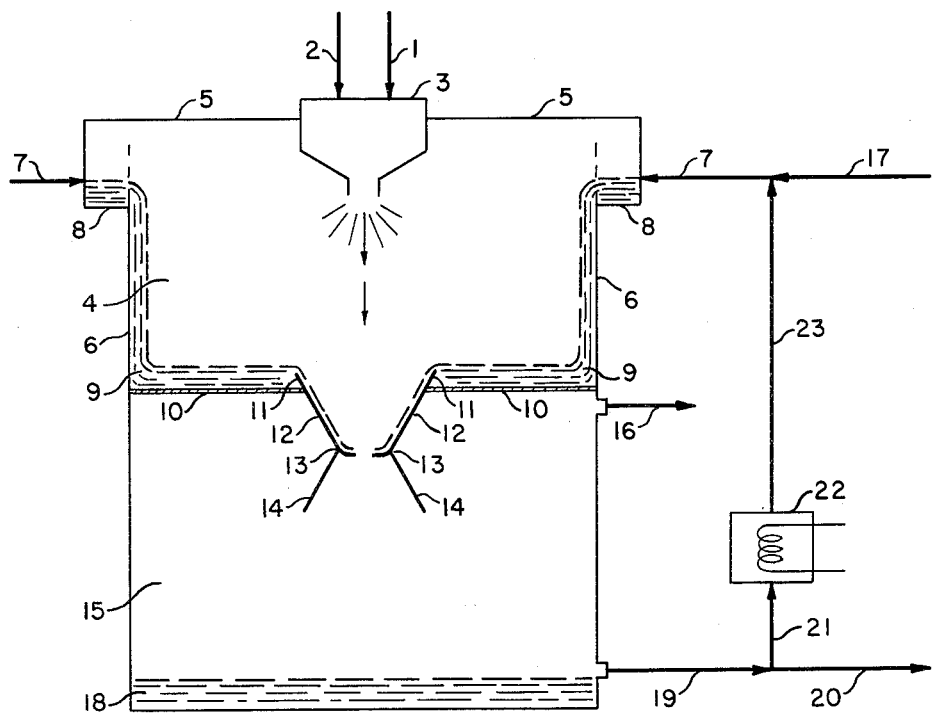
JAMES A. GROSS
INVENTOR.
BY J. W. McCloskey
AGENT

United States Patent Office 3,057,700
Patented Oct. 9, 1962

3,057,700
PHOSPHORIC ACID PROCESS
James A. Gross, East Brunswick, N.J., assignor to Chemical Construction Corporation, New York, N.Y., a corporation of Delaware
Filed Oct. 12, 1959, Ser. No. 845,920
3 Claims. (Cl. 23—283)

This invention relates to a process and apparatus for producing phosphoric acid from elemental phosphorus. It has been found that the hot phosphorus pentoxide-containing gas stream which is produced when phosphorus is reacted with air, may be cooled and hydrated by a new method using a simplified apparatus in which the velocity of the hot gas stream is increased, followed by contact of the gas stream with a transverse stream of aqueous absorbent solution.

Elemental phosphorus is usually converted to phosphoric acid by burning with air to form a hot gas stream containing particles of phosphorus pentoxide. This gas stream is then cooled and phosphorus pentoxide is recovered, by spraying aqueous absorbent solution into the gas stream in large towers known as hydrators. Here the phosphorus pentoxide is converted to phosphoric acid, and the acid is absorbed into the liquid spray solution. Usually a fairly strong acid solution is employed as the spray solution, so as to produce an acid product of commercial strength such as 75% grade.

Numerous problems have been encountered with this procedure. The burning of elemental phosphorus is a highly exothermic reaction. Usually the hot gas stream is produced at temperattures in the range of about 1200 to 2000° F. The cooling of such a hot and corrosive gas stream prior to hydration requires large and expensive equipment such as graphite heat exchangers. When preliminary cooling is not provided, the hydrator itself must be a very large cooling-absorption tower, with the combustion section usually placed at the top. Such a unit is described in U.S. Patent No. 2,708,620. Extensive and complex cooling is required when these hydrators are constructed of metallic materials such as stainless steel, in order to avoid high-temperature corrosion. Graphite or refractory-lined equipment is objectionable in this process due to product contamination by material absorbed from the refractory linings, and also because of sensitivity to rapid temperature changes which may crack these linings.

Spray hydrators are also inefficient in that only partial removal of phosphorus pentoxide from the gas stream is achieved using the conventional spraying devices and technique. Thus, various expensive units must usually be provided following the hydrator in order to recover the large proportion of phosphorus pentoxide still in the gas stream. Among these may be mentioned electrostatic precipitators, Pease-Anthony venturi scrubbers, or packed scrubbing columns followed by condensers such as described in U.S. Patent Serial No. 2,303,318.

In the present invention, a novel gas-liquid contact concept is utilized to provide rapid and complete quench cooling, hydration and absorption of phosphorus pentoxide in the hot gas stream. The velocity of the gas stream is accelerated by means of apparatus which provides a gradually narrowing flow passage. At the point where the converging flow passage walls are narrowest and gas stream velocity is greatest, means are provided whereby liquid absorbent solution is injected transverse of the gas stream flow.

Additionally, the liquid absorbent solution is interposed between the hot gas stream and the flow passage apparatus, thus protecting the apparatus against overheating and corrosion. One type of apparatus suitable for the purposes of this invention is described in U.S. Patent Serial No. 2,883,167. Following the gas-liquid contact, the liquid product containing phosphoric acid is separated from the residual gas stream.

The process and apparatus of this invention accomplishes a far higher phosphorus pentoxide recovery than hydrators or other prior art technology. In addition, simplified and less expensive apparatus is required.

It is an object of this invention to produce phosphoric acid from phosphorus.

Another object of this invention is to absorb phosphorus pentoxide from a hot gas stream in an improved manner using novel apparatus for this purpose.

A further object of this invention is to recover a higher proportion of phosphorus pentoxide from the hot gas stream during the initial cooling-hydration section of a phosphoric acid process.

Still another object of this invention is to prevent equipment failure due to overheating and hot spot formation in the steps comprising burning phosphorus and absorbing phosphorus pentoxide in phosphoric acid manufacture.

An additional object of this invention is to provide an improved process of phosphoric acid manufacture which utilizes a novel phosphorus pentoxide absorption concept to accomplish the process in efficient and inexpensive apparatus.

These and other objects of the invention will become evident from the description which follows. Referring to the FIGURE, phosphorus stream 1 and air stream 2 are passed into phosphorus burner 3 which is of conventional design and is shown here in schematic form only. The exothermic reaction which takes place in combustion chamber 4, which is preferably a circular cylindrical unit, generates a temperature of about 1500° F., as the hot gas stream proceeds downwards. Chamber 4 is constructed of corrosion-resistant stainless steel and is protected from direct contact with the hot gas stream. The roof 5 of the chamber 4 may be cooled by liquid sprays directed against the lower surface or may be lined with refractory material and externally cooled. The wall 6 of the chamber 4 is protected by means of liquid solution 7 admitted via launder 8. Liquid solution 7 overflows the edge of launder 8 and flows down the inner surface of wall 6 as a smooth curtain of liquid. This liquid stream joins liquid pool 9. Pool 9 serves to protect supporting plate 10 from the direct effects of the hot gas in chamber 4. The liquid level in pool 9 is maintained by lip 11, over which stream 7 eventually flows. Stream 7 now flows down the inside of walls 12 which define a converging flow passage. The hot gas stream velocity is accelerated in the flow passage defined by walls 12, and the hot gas is then suddenly quenched from a temperature of 800 to 1500° F. to about 170 to 250° F., and phosphorus pentoxide therein is hydrated and absorbed into the liquid stream while passing the inward curvature 13 of the walls 12. This is accomplished since the liquid stream 7, on flowing downwards inside walls 12, meets inward curvature 13 and is projected essentially transverse to the hot gas flow direction and across the gas flow stream. This type of gas-liquid contact produces a highly effective dispersion of liquid into the gas stream, and results in far more efficient recovery of phosphorus pentoxide from the gas stream than conventional sprays.

The combined gas-liquid stream now passes baffles 14 and enters lower chamber 15, in which the liquid separates from the residual gas stream. The residual gas stream leaves chamber 15 via 16, and passes to conventional means such as a Pease-Anthony venturi scrubber unit as described in U.S. Patent Serial No. 2,905,535 or packed tower, not shown, for recovery of the small proportion of phosphorus pentoxide still remaining in the gas stream. In the practice of this invention, less than 15% and usually less than 10% of the total phosphorus pentoxide generated in the combustion chamber remains in line 16. The phosphorus pentoxide content of line 16 is recovered as a dilute phosphoric acid stream in the usual case, since water is used as the final scrubbing agent. This dilute acid stream may be recycled to the process via line 17 in a manner to be described hereafter.

Returning to chamber 15, the liquid phase collects as a pool 18 and overflow acid is drawn off via 19. The strength of the strong acid stream 19 is controlled by varying the strength of the input liquid stream 7. Usually stream 7 is a fairly strong phosphoric acid solution, and becomes enriched to a commercial grade, preferably 75%, by the process of the present invention. In any case, the input liquid stream 7 is usually at least a 70% acid solution. Of course a more dilute acid or even water may be employed in line 7. However, this is less desirable since a more dilute product results. It may be; for example, that a 25% or 40% phosphoric acid solution is required for some application. These strengths can be easily attained by flooding surface areas 6 and 10 with more dilute solutions of phosphoric acid. The stream 19 in the usual practice is split, with a portion proceeding via 20 to market or other product utilization. The balance of stream 19 is recycled via 21 through cooling unit 22 which is a conventional heat exchanger. Unit 22 removes process heat derived from the combustion and hydration reactions from stream 21. The cooled recycle stream then returns to the process via 7. It is necessary to maintain a considerable recycle stream 23 relative to product stream 20 in order that the liquid flow streams within the process are of sufficient magnitude to provide adequate protection against overheating for the wall 6, plate 10 and passage wall 12 in combustion chamber 4.

Makeup stream 17 admits water or dilute phosphoric acid derived from stream 16 as previously described or from other sources to line 7, in order to balance the water inventory in the process, since water is removed via product drawoff line 20 and residual gas line 16.

Various modifications are also contemplated within the scope of the present invention. Thus for example, in place of the section defined by walls 12 and curved section 13, it would be possible to operate the present invention using other means to accelerate the gas stream velocity and achieve proper gas-liquid contact. One such means could comprise an orifice-type unit which would utilize a structure similar to plate 10 combined with lip 11 to provide a constriction in the hot gas stream flow passage. Below plate 10 a group of nozzles or other liquid injection means would be placed about the opening defined by lip 11 to provide the proper gas-liquid contact with the liquid admitted in a direction essentially transverse to gas stream flow. This modification is less desirable than the preferred apparatus shown in the figure, since greater pressure drop results in practice and thus more power is required to conduct the gas flow through the process and out via 16 using means such as an exhauster downstream of 16. Another objection to this modification would be that the portion of the total input liquid flowing over lip 11 would not contact the gas stream in the proper manner.

Another possible modification would involve providing a group of nozzles or other liquid injection means at or near the upper end of baffle 14 in the present apparatus. These liquid injection means would introduce further absorbing liquid transverse to the gas stream flow at or near the point of maximum velocity and thereby achieve more complete removal of phosphorus pentoxide from the gas stream. This modification is subject to the same objections advanced in connection with the orifice-type structure modification discussed above.

Other modifications within the scope of the present invention will occur to those skilled in the art. The above description of a preferred embodiment of the invention should not be construed to limit the scope of the process teaching of the present invention.

I claim:

1. Apparatus for producing phosphoric acid from phosphorus comprising a phosphorus combustion chamber, a phosphorus burner within said chamber, phosphorus and air inlet means extending to said burner, liquid distribution means within said chamber for directing absorbent liquid onto the inner walls of said chamber, a duct extending downwardly from the bottom of said combustion chamber, said duct having downwardly converging side walls whereby the cross-sectional area of said duct decreases in a downward direction, said duct being provided with an inwardly curved lower terminus, a liquid-gas separation container extending about the lower portion of said duct, gas removal means extending from said container, liquid recycle means comprising a liquid outlet adjacent the bottom of said container, a recycle liquid cooler, and means for admitting cooled recycle liquid to said liquid distributor means, and means adjacent the bottom of said container for product liquid removal.

2. Apparatus of claim 1, in which a flow baffle is provided within said container to facilitate separation of entrained liquid from gas, said baffle comprising a downwardly extending element depending from the lower terminus of said duct.

3. Apparatus of claim 2, in which said baffle element is essentially conically shaped, whereby sudden enlargement of the gas flow path below said duct is substantially prevented.

References Cited in the file of this patent

UNITED STATES PATENTS

| | | |
|---|---|---|
| 2,132,360 | Merchant | Oct. 4, 1938 |
| 2,272,402 | Du Bois | Feb. 10, 1942 |
| 2,767,233 | Mullen et al. | Oct. 16, 1956 |
| 2,883,167 | Krantz | Apr. 21, 1959 |
| 2,905,535 | Atkin et al. | Sept. 22, 1959 |